(12) United States Patent
Walsh (10) Patent No.: US 6,233,601 B1
(45) Date of Patent: May 15, 2001

(54) ITINERARY BASED AGENT MOBILITY INCLUDING MOBILITY OF EXECUTABLE CODE

(75) Inventor: Thomas C. Walsh, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 08/969,478

(22) Filed: Nov. 13, 1997

Related U.S. Application Data (60) Provisional application No. 60/030,906, filed on Nov. 14, 1996.

(51) Int. Cl.[7] .............................. G06F 15/16; G06F 15/18
(52) U.S. Cl. ............................................................. 709/202
(58) Field of Search .................................... 709/202, 203, 709/201, 102

(56) References Cited

U.S. PATENT DOCUMENTS 5,701,484 * 12/1997 Artsy ..................................... 709/202

OTHER PUBLICATIONS

Joosen et al. "On Flexible Support for Mobile Objects", IEEE proceedings of IWOOOS 1996. pp.3–7.*
Aglets Specification (1.0), Version 0.60, May 20, 1997.*
Chess et al. "Itinerant Agents for Mobile Computing" IBM Research Report RC 200010 (Mar. 27, 1995).*
Lawton "Agents to roam the Internet", SunWorld, Oct. 1996. (http://www.sunworld.com/sunworldonline/swol–10–1996/swol–10–agent_p.html).*
Tim Finin, "Mobile Agents—UMBC AgentWeb", http:www.cs.umbc.edu/agents/mobile/.*
George Lawton, "Agents to roam the Internet," SunWorld, Oct. 1996. http://www.sunworld.com/sunworldonline/swol–10–1996/swol–10–agent_p. html.*
Danny B. Lange and Yariv Aridor, "Agent Transfer Protocol—ATP/0.1", IBM Tokyo Research Laboratory, Mar. 19, 1997. http://www/trl.ibm.co.jp/aglets/atp.htm.*
Weiyi Li and David G. Messerschmitt, "Java–To–Go—Intinerative computing Using Java," Sep. 10, 1996. http://ptolemy.eecs.berkeley.edu/dgm/javatools/java–to–go/.*

* cited by examiner

Primary Examiner—Dung C. Dinh
(74) Attorney, Agent, or Firm—Dirk Brinkman (57) ABSTRACT

In accordance with the present invention, a mobile agent object executes a first method on a first computer, migrates from the first computer to a second computer, and executes a second method on the second computer. The first and second methods and first and second computers are designated in an itinerary. The agent includes both data and executable code which are serialized for transmission from the first computer to the second computer as data. The data containing the agent is then deserialized in the second computer to regenerate the agent in the form of an object. The executable code portion of the agent can be supplemented with code from a home codebase located on another computer.

48 Claims, 6 Drawing Sheets

ITINERARY BASED AGENT MOBILITY INCLUDING MOBILITY OF EXECUTABLE CODE

CROSS REFERENCE TO RELATED APPLICATIONS

A claim of priority is made to U.S. provisional patent application Ser. No. 60/030,906, entitled USE AND COLLABORATION OF MOBILE AGENTS IN A COMPUTER NETWORK, filed Nov. 14, 1996.

STATEMENT REGARDING FEDERALLY SPONSORED RESEARCH OR DEVELOPMENT

Not applicable

BACKGROUND OF THE INVENTION

The present invention is generally related to network computing, and more particularly to mobile objects.

Mobile objects that are transmitted across a computer network are known. Mobile objects are comprised of code and data, both of which are transmitted across the computer network. Technologies such as client-server protocols, remote procedure call protocols, and distributed object technologies are employed to transmit mobile objects across the computer network. These technologies implement either a "push" model or a "pull" model, both of which have drawbacks.

In a "pull" model the code for an executing object is downloaded from a network source such as a web server. When a particular portion of code becomes necessary for operation, that portion of code is first sought on the local filesystem. If the local filesystem does not include that portion of the code, a network request is sent to another computer in the network in order to prompt transmission of that portion of code to the local computer. However, as different classes of sub-objects are created, a separate network request must be sent to retrieve code for each class. In the case of a Hyper-Text Transfer Protocol ("HTTP") request, each request must re-establish a Transmission Control Protocol/Internet Protocol ("TCP/IP") socket connection to the web server. Thus, when downloading a large number of classes, a large number of connections must be established and a large amount of network overhead is incurred.

Another drawback associated with the pull model is that as an object travels, the code which enables the object to operate must be re-downloaded at each computer. More particularly, when the object arrives at each a destination computer, the object downloads any code which is required but not present on the local filesystem, even if that code was downloaded at the previous destination computer. Previously downloaded code is not cached. Network overhead is incurred as a consequence.

In a "push" model the code for an executing object is carried with the mobile object. Prior to launching the mobile object, all of the code that will be needed by the object is identified. The code is packaged with the agent and pushed around the network to each destination computer. While the push model reduces network requests in comparison with the pull model, network overhead is still incurred because of the relatively large amount of code that is pushed to every destination computer. In some cases the object will push code for classes that are no longer needed. For example, an agent may create an instance of a particular class of object only in very exceptional circumstances. In such a case it is inefficient for the object to push the code for this class.

Another limitation of known mobile objects is difficulty in examining and predicting destination information. Known mobile objects initiate travel by performing a subroutine call. The method is sometimes given a name such as "go" or "moveTo," and the caller is responsible for specifying a name or Uniform Resource Locator ("URL") indicating the destination computer for the mobile object. When the travel method is called, the execution of the mobile object is halted and the mobile object is converted into a network transmittable form. On the destination computer the mobile object is restored from the network form and restarted. This restart can either occur on the instruction directly following the call to the travel method, or at the beginning of some known method.

BRIEF SUMMARY OF THE INVENTION

In order to provide efficient mobility of code for a mobile agent object ("agent"), a "mobile codebase" object is constructed. The mobile codebase travels with the agent and serves as a repository of code for classes that facilitate agent operation. When the agent is launched, the launcher specifies a list of related classes. These classes are retained in the mobile codebase. The launcher also specifies a Uniform Resource Locator ("URL") that points to a network source ("home codebase") from which code can be downloaded. If the agent is required to instantiate an object comprising code that is not in the mobile codebase, a network request is sent to the home codebase to retrieve that code. Code that is downloaded in this manner is retained in the mobile codebase.

The combination of the mobile codebase and home codebase improve agent operation and reduce network overhead. In a preferred embodiment an agent is launched with a mobile codebase that is preloaded with classes which are certain to be needed. Classes that are unlikely to be needed are stored in the home codebase. Thus the agent with mobile codebase and home codebase provide the desirable features of the push and pull models without the undesirable network overhead incurred by transmitting unneeded classes around the network or re-downloading code.

Agent travels are defined by an itinerary data structure. The itinerary is composed of a list of destinations, each of which includes: (1) the hostname of a destination computer on the network to which the agent should travel, and (2) the name of a method that the agent should execute when the agent arrives at the destination computer. An agent is allowed to modify its itinerary. When an agent modifies its itinerary, the agent owner is automatically notified, thus allowing the owner to "follow" the agent wherever it may travel.

The itinerary provides advantages related to agent and network management. Inspection of the agent itinerary reveals where the agent has travelled and where the agent may travel in the future. Since the itinerary is a standard data structure, an observer ran depend on it to be present. Further, since the itinerary is a separate data structure from the agent, the observer does not need special knowledge of the internal structure of the agent in order to examine the itinerary.

BRIEF DESCRIPTION OF THE DRAWING

The invention will be more fully understood from the following Detailed Description of the Invention, in conjunction with the Drawing, of which.

DETAILED DESCRIPTION OF THE INVENTION

U.S. Provisional Patent Application Ser. No. 60/030,906, filed Nov. 14, 1996, entitled USE AND COLLABORATION OF MOBILE AGENTS IN A COMPUTER NETWORK is incorporated herein by references.

Figure 1:
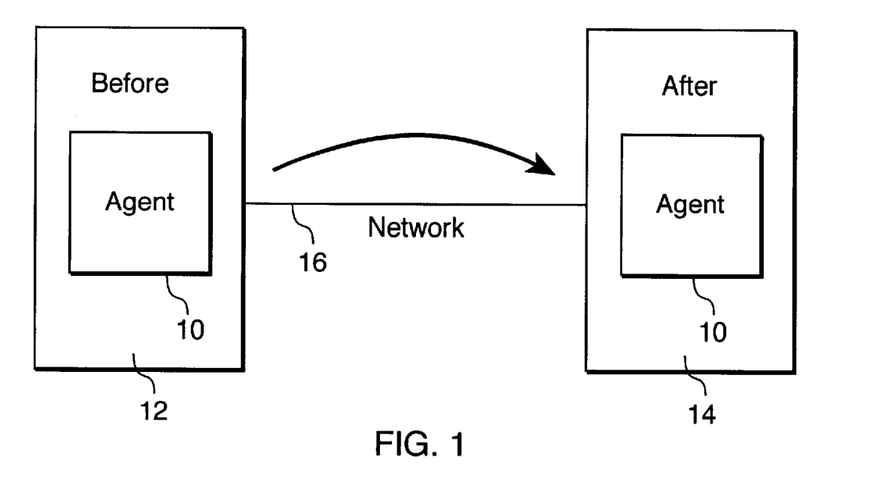
FIG. 1 is a block diagram which illustrates agent migration.

Referring to FIG. 1, an agent 10 comprises a mobile object which can travel from a first computer 12 to a second computer 14 in a computer network 16. The agent is generated and stored in memory on the first computer for a specific purpose, and includes both data and executable code. The agent executes on the first computer and then migrates to the second computer by being transmitted across the network. The agent then resumes execution on the second computer. When the agent completes execution on the second computer, the agent acts in accordance with an agent itinerary. For example, the agent will migrate to another computer if the itinerary so indicates.

Figure 2:
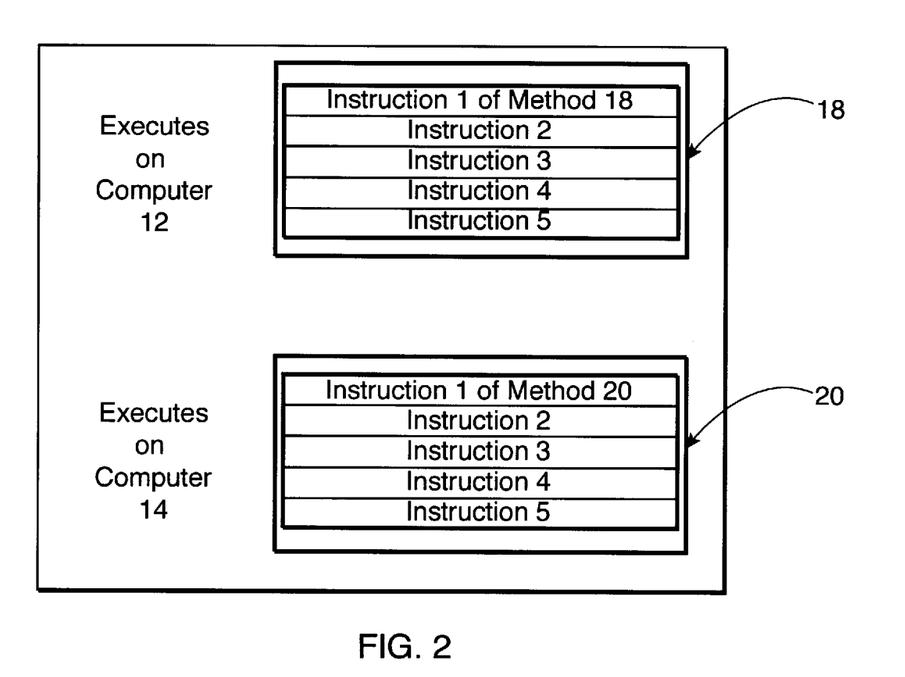
FIG. 2 is a block diagram which illustrates agent execution in conjunction with agent migration.

Referring now to FIGS. 1 and 2, the agent executes a sequence of instructions during operation. In particular, a first method 18 is executed on the first computer 12 and a second method 20 is executed on the second computer 14. As a result, migration between computers is transparent from the perspective of the agent.

Figure 4:
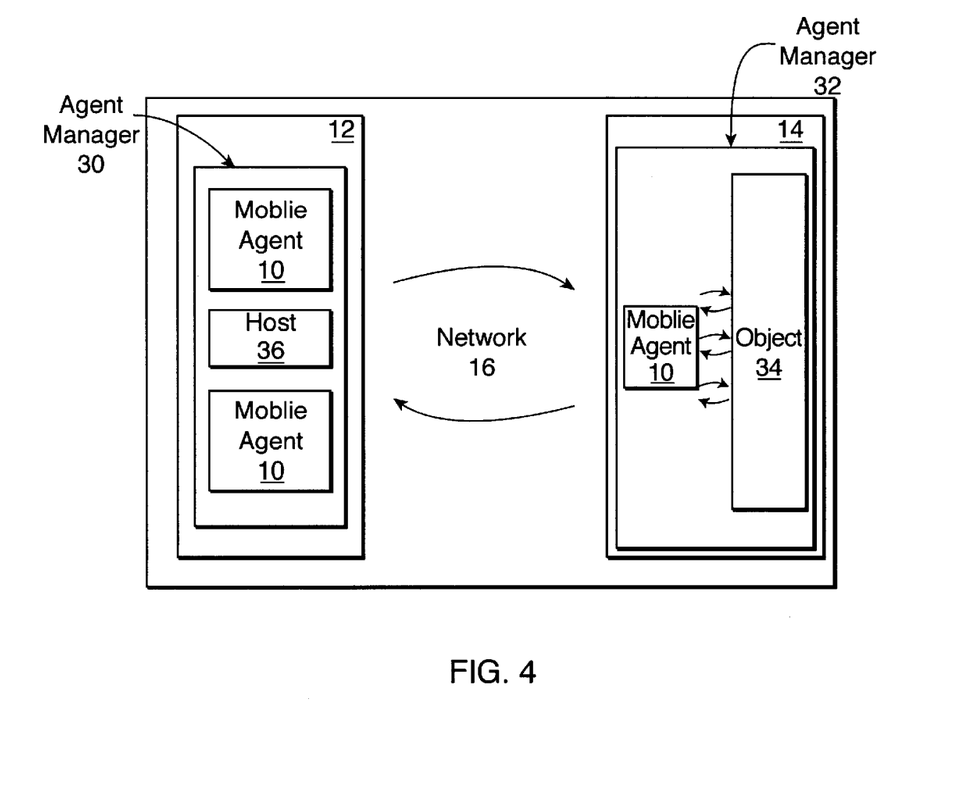
FIG. 4 is a block diagram of agent interaction with agent managers on multiple computers in a network.

Referring to FIG. 4, agent mobility is preferably facilitated through use of JAVA agent manager Objects 32 and an Object Serialization facility (a product of Sun Microsystems which is known in the art). Object Serialization operates to serialize objects such that a representative stream of bytes, i.e., data, is generated therefrom. Object Serialization facilitates transmission of an agent across the network by serializing the agent 10 into a format that is suitable for network transmission. Serialization of the agent may also include serialization of sub-objects which are contained within member variables of the agent. In accordance with the present invention, the serialization process involves the serialization of executable code, data, and an itinerary as hereinafter discussed in greater detail. Once the agent has been serialized, a communication socket to the second computer is opened and the resulting stream of bytes is transmitted to the second computer along the socket.

The serialized agent is regenerated in the second computer 14 upon arrival. In particular, the stream of bytes transmitted along the socket is deserialized in the second computer. Deserialization regenerates the agent in the form in which the agent existed prior to migration, i.e., an object. Following deserialization, the agent executes a predetermined method specified by its itinerary. The predetermined method may prompt interaction with another object 34 located on the second computer. When the method has been executed, the agent is serialized and transmitted to yet another computer, or possibly back to the first computer. The agent is therein deserialized upon arrival and proceeds to execute another predetermined method and interact with that computer. In the case of the agent migrating back to the first computer, such interaction could be with a host application 36 through which an information query was entered. The agent continues migrating across the network in this manner as execution requires. Eventually, the agent is terminated when execution of the itinerary is complete. It should be noted that the agent need not necessarily migrate to the initial host (first) computer after executing on a remote (second) computer. The agent could travel to multiple computers, and may not return to the initial host computer.

Figure 3:
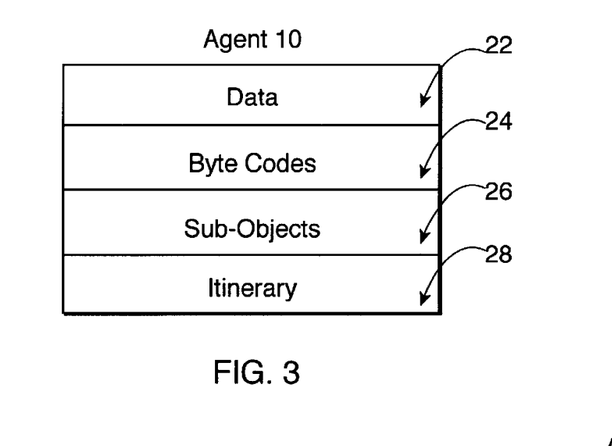
FIG. 3 is a block diagram of an agent.

Referring to FIG. 3, each agent may include data 22, code 24, sub-objects 26 and an itinerary 28. The data portion 22 includes internal state information associated with the agent. The code portion 24 includes executable code associated with operation of the agent. The itinerary portion 28 specifies destinations for the agent. Sub-objects 26 include code of distinct objects contained within the agent. The agent carries the code for these sub-objects.

The code 24 portion of the agent 10 includes a mobile codebase and a reference pointer to a home codebase. The mobile codebase comprises executable code which is retained as part of the agent. When the agent migrates, the mobile codebase is transmitted along with the data, sub-objects and itinerary to the destination. The home codebase is executable code which resides on the computer which originally created and launched the agent or a suitable network server (such as a web server). The reference pointer to the home codebase is a Uniform Resource Locator ("URL") that allows remote access to the home codebase from other computers in the network. If the agent requires code that is not present in the mobile codebase during execution, the agent retrieves the required code from the home codebase and retains such retrieved code in the mobile codebase.

Figure 6:
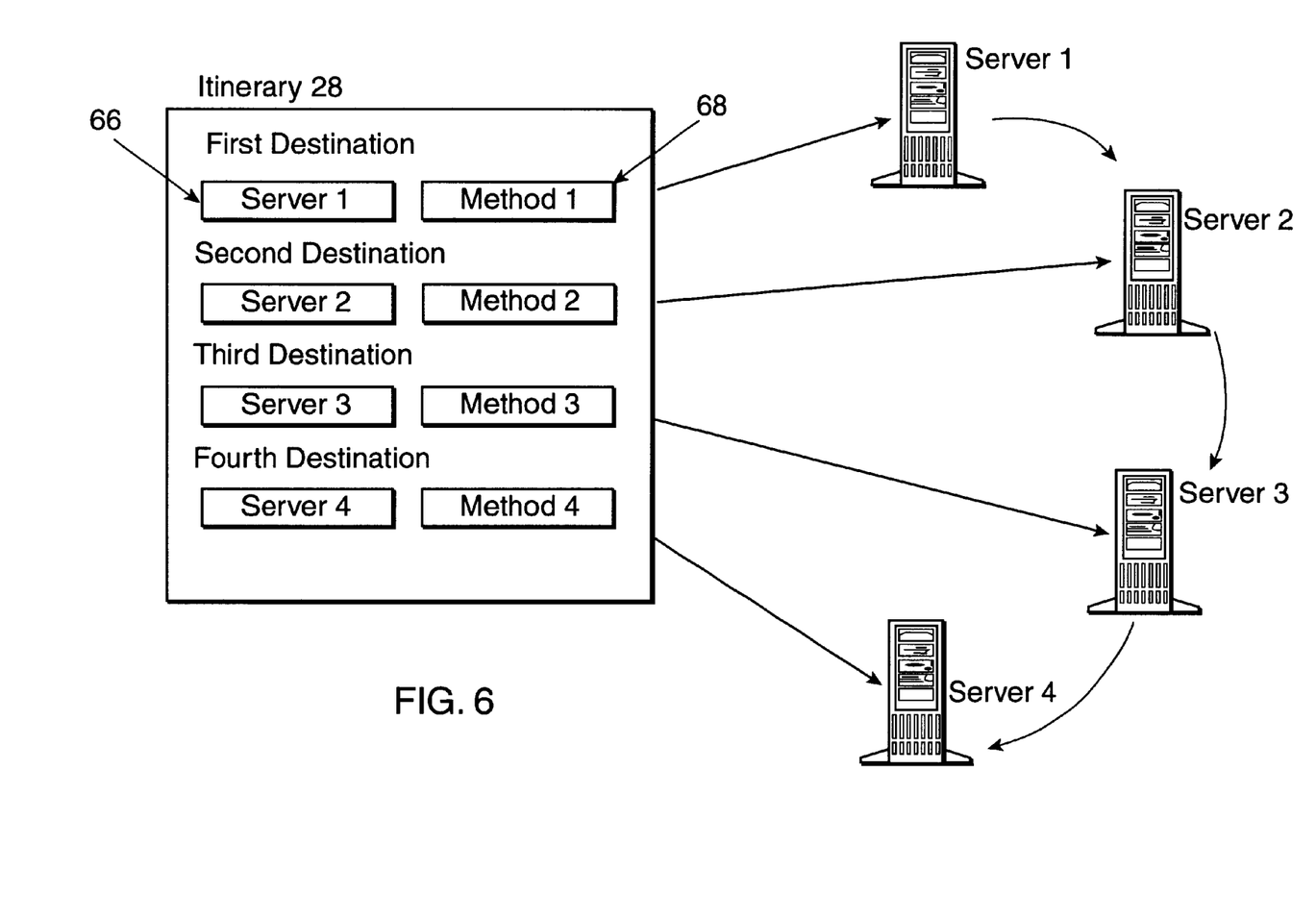
FIG. 6 is a block diagram which illustrates agent operation according to an itinerary.

Referring to FIGS. 3 and 6, the itinerary 28 is a data structure which defines agent migration parameters. The itinerary is composed of a list of destinations and the name of a method associated with each such destination. In a preferred embodiment, each destination entry contains the Transmission Control Protocol/Internet Protocol ("TCP/IP") host name of a computer on the network to which the agent is designated to migrate. The method associated with the respective destination is invoked upon arrival at that destination. Hence, each destination represents a location and a task to be performed at the location.

Figure 5:
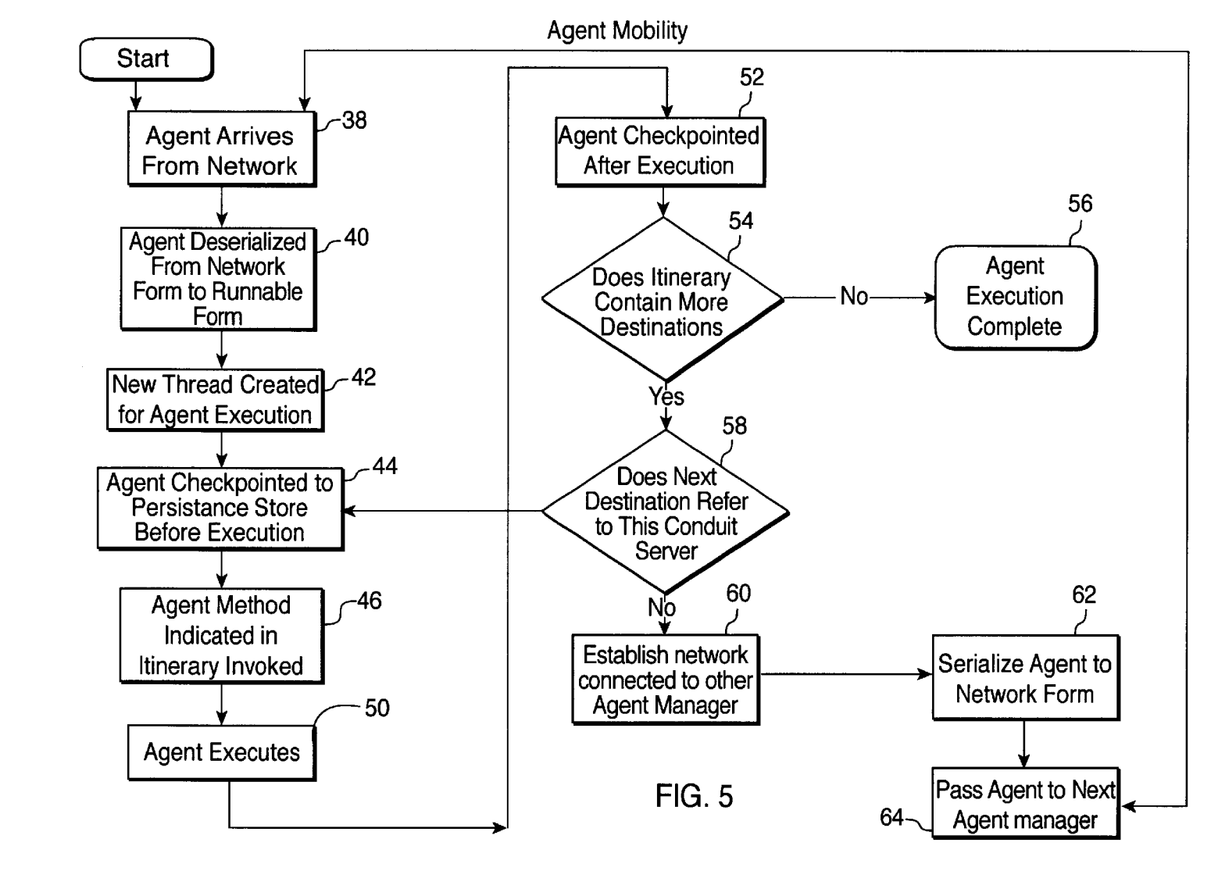
FIG. 5 is a flow chart which illustrates agent mobility.

FIGS. 4 and 5 illustrate agent mobility. When the determination is made that the agent should migrate, the agent manager 30 examines the itinerary 28 to ascertain the next destination to which the agent 10 is designated to migrate. The agent manager 30 establishes a network connection to the agent manager 32 at the destination computer 14. The agent manager 30 passes the agent and related travel information to the destination agent manager 32. The agent manager 30 then deletes the local copy of the agent, terminates any execution threads which were being used by the agent, and performs other appropriate clean up activities.

From the perspective of the destination computer, the agent arrives at the destination computer as illustrated in step 38. As previously described, the agent arrives in the form of data which includes the code, sub-objects, itinerary and other data. Java/Object Serialization assists the de-serialization and reconstruction of the agent as depicted in step 40. The server then spawns a new thread in which the agent will execute as shown in step 42. A persistent local copy of the agent is then made as illustrated in step 44. As depicted in step 46 the agent manager invokes the proper method of the agent for execution in the spawned thread at this node. The itinerary contains information indicating which method should be invoked at each designated destination computer. The agent then executes as illustrated in step 50.

When the agent has completed execution of the indicated method, another persistent copy of the agent is stored on the local disk as depicted in step 52 in order to prevent redundant execution in the event that the computer malfunctions before the agent migrates. The agent manager then examines the agent itinerary as illustrated in decision step 54. If the itinerary does not indicate any further destinations then agent execution is deemed complete as shown in step 56. However, if the itinerary indicates further destinations, then the agent manager determines whether the next destination is associated with another computer in decision step 58. If the next destination is not another computer, flow returns to step 44, thereby bypassing network traffic. However, if the next destination is associated with a different agent manager then a network connection to the indicated agent manager is established as depicted in step 60. The destination contains a string which indicates where to travel. The string contains either the name (host name) of a computer or a URL to a distributed object. The agent is then serialized as illustrated in step 62 and subsequently transmitted to the next agent manager as depicted in step 64.

Migration in accordance with the itinerary 28 is further illustrated in FIG. 6. The itinerary includes a listing including identification of each agent manager 66 to which the agent is configured to migrate and identification of a method 68 to execute at each respective agent manager. The agent migrates through the agent managers listed in the itinerary sequentially in the order in which the servers are listed, invoking each respective method upon arrival. Such method could be, for example, querying or updating a database on the destination computer.

Figure 7:
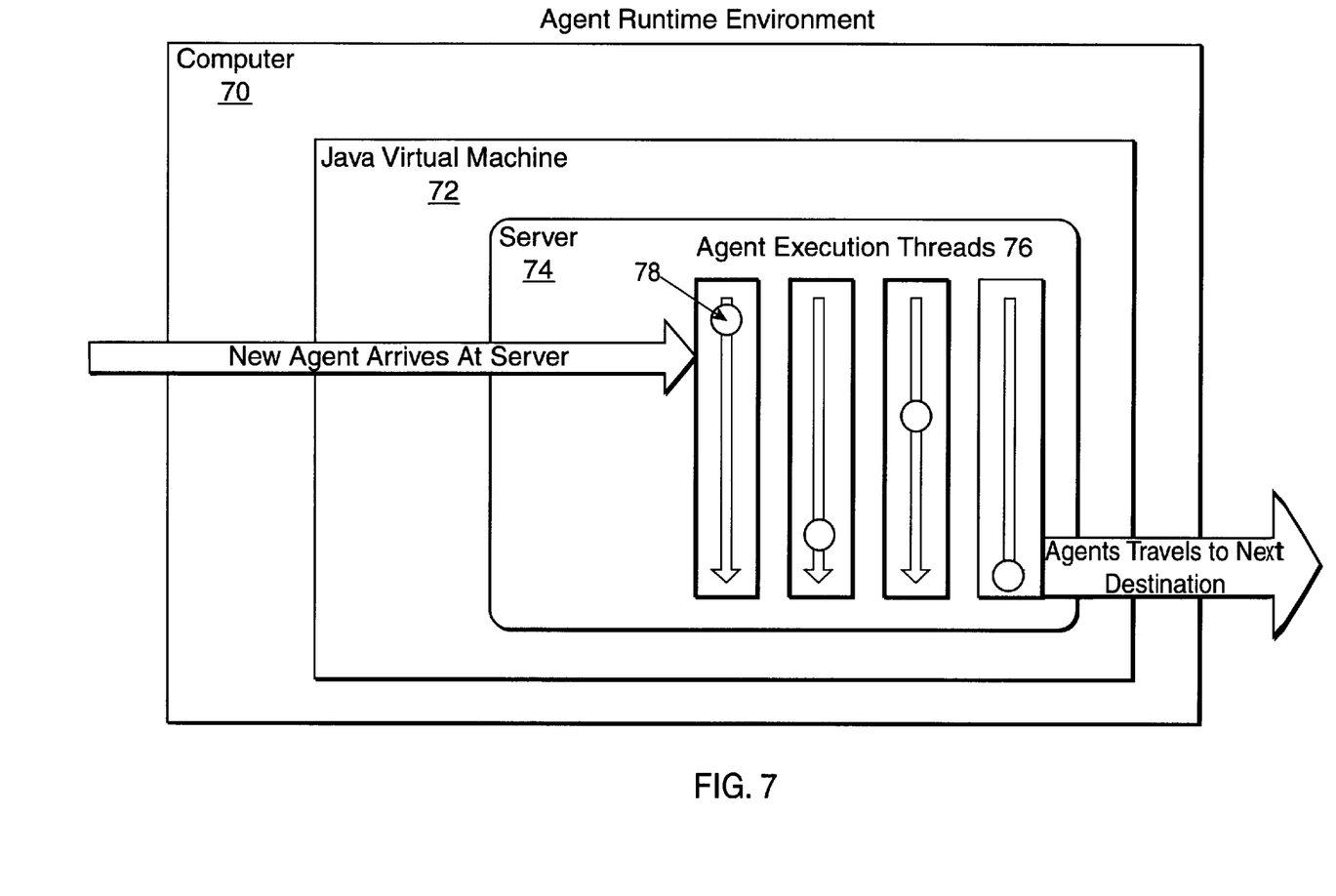
FIG. 7 is a block diagram which illustrates the agent runtime environment.

FIG. 7 illustrates the agent runtime environment. Each computer 70 on the network includes a Java Virtual Machine 72 running therein. A agent manager 74 runs on each respective Virtual Machine 72. The agent manager includes a plurality of threads 76, each thread having an agent 78 associated therewith. In particular, a new thread is formed when a new agent arrives at the server, and the agent executes on that thread. Security mechanisms prevent each agent from operating outside the scope of the associated thread. When agent execution completes, the agent migrates to the next destination identified in the itinerary.

In order for migration and execution to function properly, the agent manager modifies the mechanism by which Java loads classes. The Java standard library provides an object called a "ClassLoader" which can be subclassed by a programmer to modify the rules that Java follows to load classes. The ClassLoader class allows web browsers to download "applets" from a web server. The agent manager provides a specialized ClassLoader which allows the executable code for mobile agents to travel with the agent.

During a typical execution of a Java program, a Java interpreter loads classes as needed for execution from a logical file system on the local computer. However, agents become separated from the home computer and the home codebase during migration, i.e., agents are separated from the directory or directories on the filesystem of the home computer where the code is stored. Further, sub-objects sometimes need to be created as the agent executes, either as member variables or as temporary variables within the methods. These sub-objects could be instances of classes which are part of the standard Java packages or they could be instances of new classes written by the programmer of the agent. However, since the agent is executing on a different computer than the home computer following migration, the Java virtual machine may not be able to directly retrieve the code for the particular sub-object. To allow agents to properly load classes and construct objects when remote from the home computer, a special ClassLoader is employed by the agent manager whenever an agent attempts to construct an object. The ClassLoader object first attempts to locate a class on the local file system of the computer. If the class is not on the local file system, the ClassLoader searches the mobile codebase. If such attempt fails, the ClassLoader sends a request back to the home machine of the agent. The agent's travel information contains a reference such as a URL which refers back to the home codebase on the home computer, and by accessing the URL the ClassLoader can retrieve classes from the home computer.

Figure 8:
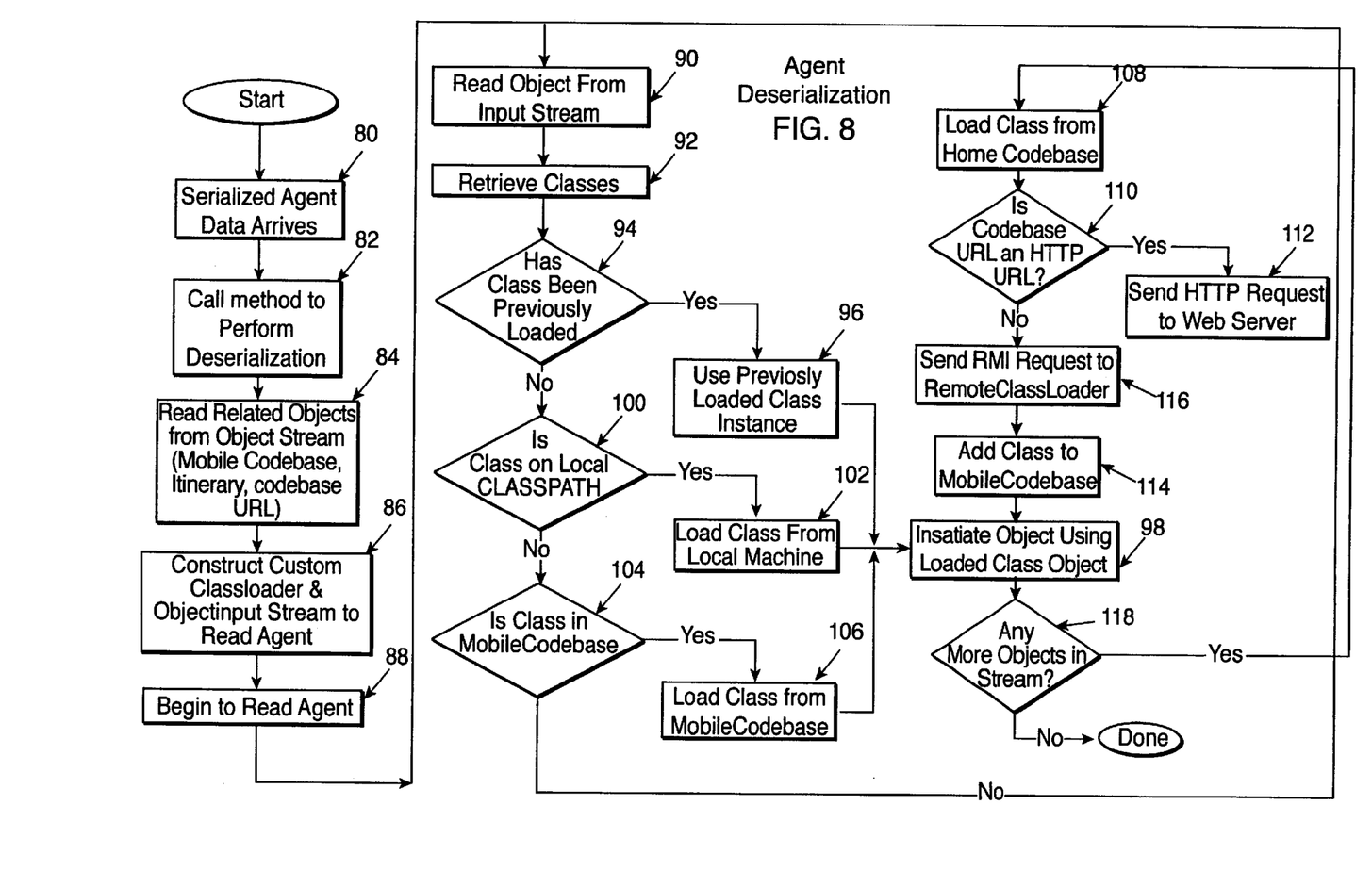
FIG. 8 is a flow chart which illustrates agent deserialization.

Agent deserialization is illustrated in FIG. 8. As depicted in step 80 the serialized agent arrives as a stream of data. Java Development Kit Object Serialization classes then call an agent manager related method to perform deserialization as shown in step 82. The method reads agent related objects from the object stream as depicted in step 84. In particular, the mobile codebase, itinerary and codebase URL are read by the method. A custom Classloader and Object Input Stream are constructed as shown in step 86. Object Serialization then reads the agent and other objects from the input stream as depicted in step 88 and step 90, respectively. When the related objects are read, the ClassLoader retrieves the classes which comprise the agent as illustrated in step 92.

The new object's class is loaded once the classes are retrieved. As depicted in step 94, if the class is determined to have been previously loaded then the previously loaded class instance is employed (step 96) and the object is instantiated using the loaded class object as shown in step 98. However, if the class has not been previously loaded as determined in inquiry step 94, then inquiry is made as to whether the class is on the local class path of the destination computer as illustrated in decision step 100. If the class is present on the local machine then the class is loaded therefrom as shown in step 102 and the object is instantiated using the loaded class object as depicted in step 98. However, if the class is not found on a local class path as shown in step 100 then an inquiry is made as to whether the class is in the mobile codebase as shown in step 104. If the class is located in the mobile codebase then the class is loaded therefrom as shown in step 106 and the object is instantiated using the loaded class object as shown in step 98. However, if the class is not located in the mobile codebase in decision step 104 then the class is loaded by accessing the home codebase as shown in step 108. If the codebase pointer is an Internet type pointer such as a Hyper-Text Transfer Protocol ("HTTP") URL, as determined in inquiry step 110, then an HTTP request is sent to the local web server as shown in step 112 and the retrieved class is added to the Mobile CodeBase as depicted in step 114. However, if the codebase URL is not a HTTP URL then a remote method request is sent to a RemoteClassLoader object as shown in step 116 and the class is added to the mobile codebase as shown in step 114. In either case, the object is instantiated using the loaded class object as shown in step 98. If more objects exist in the stream to be retrieved, as determined in decision step 118, then another object is read from the input stream as illustrated in step 90. If there are no more objects to be retrieved, flow terminates.

Having described the preferred embodiments of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

What is claimed is:

1. In a computer network including at least a first computer and a second computer, an apparatus for performing a task in a second computer, comprising:
   a routine that generates a mobile agent object in the first computer, the mobile agent including both data and executable code;
   a protocol for transmission of the mobile agent from the first computer to the second computer, wherein execution of the mobile agent in the second computer following such transmission prompts the task to be performed in the second computer; and
   an itinerary containing a reference to each destination computer to which the mobile agent is designated to migrate and a reference to a method associated with each respective destination computer reference, the respective method being invoked when the mobile agent is present on the respective destination computer.

2. The apparatus of claim 1 wherein the transmission protocol includes a routine in the first computer for serializing the mobile agent to generate a stream of data therefrom.

3. The apparatus of claim 2 wherein the transmission protocol includes a routine in the second computer for deserializing the stream of bytes to regenerate the mobile agent therefrom.

4. The apparatus of claim 1 wherein the task is data gathering, and wherein the mobile agent is transmitted back to the first computer from the second computer following completion of such data gathering.

5. The apparatus of claim 1 wherein the mobile agent migrates to a plurality of destination computers within the computer network.

6. The apparatus of claim 1 wherein at least one destination computer reference is a Uniform Resource Locator.

7. The apparatus of claim 1 wherein at least a portion of the executable code required for invoking the method is retrieved from a mobile codebase portion of the executable code included in the mobile agent.

8. The apparatus of claim 7 wherein the mobile agent includes a reference to a home codebase located on the first computer, the reference being employed to retrieve required executable code which is not present in the mobile codebase.

9. The apparatus of claim 8 wherein required executable code is sought first in the computer on which the mobile agent is executing, then in the mobile codebase, and finally on the home codebase.

10. The apparatus of claim 8 wherein a new thread is formed for execution of the mobile agent in the destination computer following receipt of the mobile agent, and wherein a security feature prevents the mobile agent from operating outside a scope assigned to such thread.

11. The apparatus of claim 8 wherein the mobile agent further includes sub-objects.

12. The apparatus of claim 1 wherein a persistent local copy of the mobile agent is stored following receipt of the mobile agent, and wherein such copy is overwritten with an updated persistent copy following agent execution.

13. In a computer network including at least a first computer and a second computer, a method for performing a task in a second computer, comprising the steps of:
   generating a mobile agent object in the first computer, the mobile agent including both data and executable code;
   transmitting the mobile agent from the first computer to the second computer;
   receiving the mobile agent in the second computer; and
   executing the mobile agent in the second computer in accordance with an itinerary which contains a reference to each destination computer to which the mobile agent is designated to migrate and a reference to a method associated with each respective destination computer reference, the method associated with the second computer being invoked when the mobile agent is present on the second computer.

14. The method of claim 13 including the further step of serializing the mobile agent to generate a stream of data therefrom in the first computer.

15. The method of claim 14 including the further step of deserializing the stream of bytes to regenerate the mobile agent therefrom in the second computer.

16. The method of claim 13 wherein the task is data gathering, and including the further step of transmitting the mobile agent back to the first computer from the second computer following completion of such data gathering.

17. The method of claim 13 including the further step of causing the mobile agent to sequentially migrate to a plurality of destination computers within the computer network.

18. The method of claim 13 including the further step of employing a Uniform Resource Locator as one of the at least one destination computer reference.

19. The method of claim 13 including the further step of retrieving at least a portion of the executable code required for invoking the method from a mobile codebase portion of the executable code included in the mobile agent.

20. The method of claim 19 wherein the mobile agent includes a reference to a home codebase located on the first computer, and including the further step of employing the reference to retrieve required executable code which is not present in the mobile codebase.

21. The method of claim 20 including the further step of searching for required executable code first in the computer on which the mobile agent is executing, then in the mobile codebase, and finally on the home codebase.

22. The method of claim 21 including the further step of forming a new thread in the destination computer for execution of the mobile agent following receipt thereof, and wherein a security feature prevents the mobile agent from operating outside a scope assigned to such thread.

23. The method of claim 21 including the further step of inserting sub-objects into the mobile agent.

24. The method of claim 13 including the further step of storing a persistent local copy of the mobile agent following receipt thereof, and overwriting such copy with an updated persistent copy following agent execution.

25. In a computer network including at least a first computer and a second computer, an apparatus for performing a task in a second computer, comprising:
   a routine that generates a mobile agent object in the first computer, the mobile agent including both data and executable code;
   a protocol for transmission of the mobile agent from the first computer to the second computer, wherein execution of the mobile agent in the second computer following such transmission prompts the task to be performed in the second computer, at least a portion of the executable code required for execution being retrieved from a mobile codebase portion of the executable code included in the mobile agent; and
   a reference to a home codebase located on the first computer, the reference being employed to retrieve required executable code which is not present in the mobile codebase.

26. The apparatus of claim 25 wherein the transmission protocol includes a routine in the first computer for serializing the mobile agent to generate a stream of data therefrom.

27. The apparatus of claim 26 wherein the transmission protocol includes a routine in the second computer for deserializing the stream of bytes to regenerate the mobile agent therefrom.

28. The apparatus of claim 25 wherein the task is data gathering, and wherein the mobile agent is transmitted back to the first computer from the second computer following completion of such data gathering.

29. The apparatus of claim 25 wherein the mobile agent migrates to a plurality of destination computers within the computer network.

30. The apparatus of claim 29 wherein the mobile agent further includes an itinerary containing a reference to each destination computer to which the agent is designated to migrate and a reference to a method associated with each respective destination computer reference, the respective method being invoked when the mobile agent is present on the respective destination computer.

31. The apparatus of claim 30 wherein at least one destination computer reference is a Uniform Resource Locator.

32. The apparatus of claim 25 wherein required executable code is sought first in the computer on which the mobile agent is executing, then in the mobile codebase, and finally on the home codebase.

33. The apparatus of claim 25 wherein a new thread is formed for execution of the mobile agent in the destination computer following receipt of the mobile agent, and wherein a security feature prevents the mobile agent from operating outside a scope assigned to such thread.

34. The apparatus of claim 25 wherein the mobile agent further includes sub-objects.

35. The apparatus of claim 30 wherein a persistent local copy of the mobile agent is stored following receipt of the mobile agent, and wherein such copy is overwritten with an updated persistent copy following agent execution.

36. In a computer network including at least a first computer and a second computer, a method for performing a task in a second computer, comprising the steps of:

generating a mobile agent object in the first computer, the mobile agent including both data and executable code;

transmitting the mobile agent from the first computer to the second computer;

receiving the mobile agent in the second computer;

retrieving at least a portion of the executable code required for invoking the method from a mobile codebase portion of the executable code included in the mobile agent;

employing a reference to a home codebase located on the first computer to retrieve required executable code which is not present in the mobile codebase; and executing the mobile agent in the second computer such that the mobile agent prompts the task to be performed in the second computer.

37. The method of claim 36 including the further step of serializing the mobile agent to generate a stream of data therefrom in the first computer.

38. The method of claim 37 including the further step of deserializing the stream of bytes to regenerate the mobile agent therefrom in the second computer.

39. The method of claim 36 wherein the task is data gathering, and including the further step of transmitting the mobile agent back to the first computer from the second computer following completion of such data gathering.

40. The method of claim 36 including the further step of causing the mobile agent to sequentially migrate to a plurality of destination computers within the computer network.

41. The method of claim 40 wherein the mobile agent further includes an itinerary which contains a reference to each destination computer to which the agent is designated to migrate and a reference to a method associated with each respective destination computer reference, and including the further step of invoking the method associated with the respective destination computer when the mobile agent is present on the respective destination computer.

42. The method of claim 41 including the further step of employing a Uniform Resource Locator as one of the at least one destination computer reference.

43. The method of claim 36 including the further step of searching for required executable code first in the computer on which the mobile agent is executing, then in the mobile codebase, and finally on the home codebase.

44. The method of claim 36 including the further step of forming a new thread in the destination computer for execution of the mobile agent following receipt thereof, and wherein a security feature prevents the mobile agent from operating outside a scope assigned to such thread.

45. The method of claim 36 including the further step of inserting sub-objects into the mobile agent.

46. The method of claim 41 including the further step of storing a persistent local copy of the mobile agent following receipt thereof, and overwriting such copy with an updated persistent copy following agent execution.

47. The method claim 36, further comprising the step of:

incorporating the retrieved required executable code into the mobile codebase.

48. The apparatus of claim 25, wherein the retrieved required executable code is incorporated into the mobile codebase.

* * * * *